United States Patent [19]
Hawes

[11] 3,744,826
[45] July 10, 1973

[54] MEANS FOR CONNECTING STRUCTURAL MEMBERS TOGETHER

[75] Inventor: Frederick L. Hawes, Ladue, Mo.

[73] Assignee: Tetra Plastics, Inc., Chesterfield, Mo.

[22] Filed: July 12, 1971

[21] Appl. No.: 161,745

[52] U.S. Cl.............. 287/189.36 D, 52/620, 52/738
[51] Int. Cl............................................... F16b 5/00
[58] Field of Search.......... 287/189.36 D, 189.36 C; 52/620, 580, 627, 738

[56] References Cited
UNITED STATES PATENTS

| | | | |
|---|---|---|---|
| 3,487,602 | 1/1970 | Braun et al. | 52/620 |
| 2,638,162 | 5/1953 | Heitlinger et al. | 287/189.36 D X |
| 2,710,081 | 6/1955 | Fink | 287/189.36 D |
| 3,143,195 | 8/1964 | Schroeder | 287/189.36 D |
| 3,460,860 | 8/1969 | Stevens | 287/189.36 D X |
| 2,189,159 | 2/1940 | Anschicks | 287/189.36 D X |
| 2,802,487 | 8/1957 | Breehl | 287/189.36 D X |

*Primary Examiner*—David J. Williamowsky
*Assistant Examiner*—Wayne L. Shedd
*Attorney*—Charles B. Haverstock

[57] ABSTRACT

Improved means for connecting members together, such as members used in various types of structures including structures formed by connected members which may be filled with a filler material for some purpose, said filler material cooperating with the connected members to strengthen the structures. The subject means may, for example, be used for attaching edging strips to sheet members or walls to form a structural connection therebetween, and such connection using the subject means can be accomplished easily and quickly even at an assembly and installation site, if necessary.

18 Claims, 4 Drawing Figures

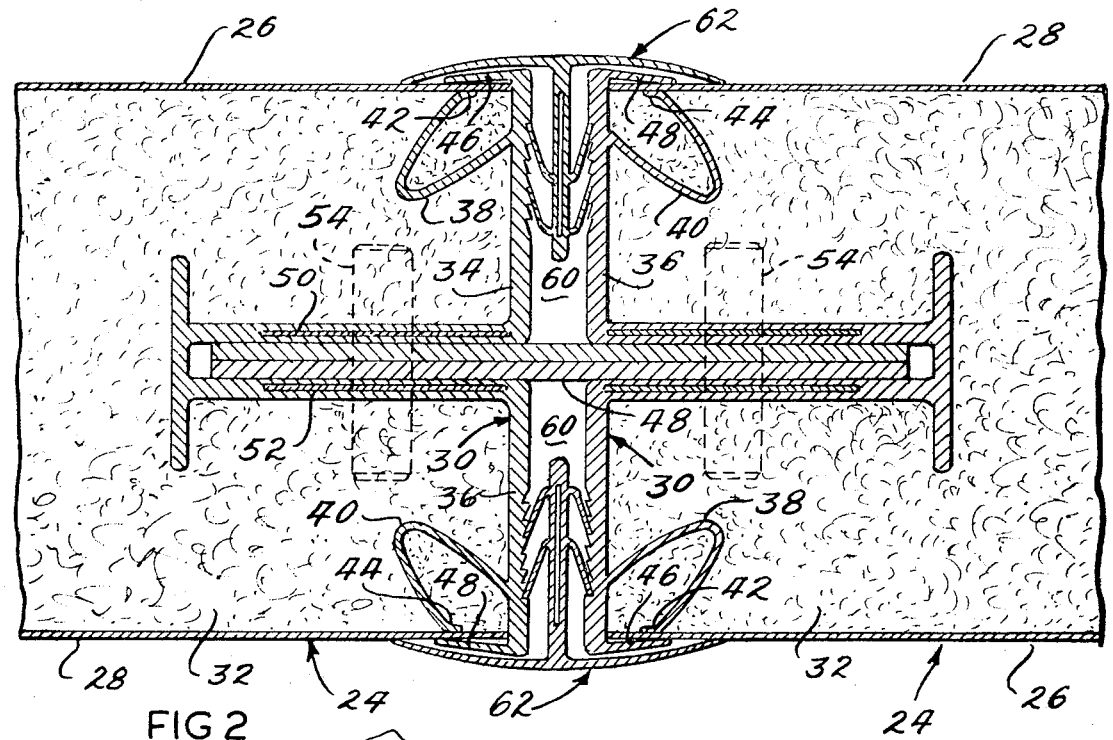
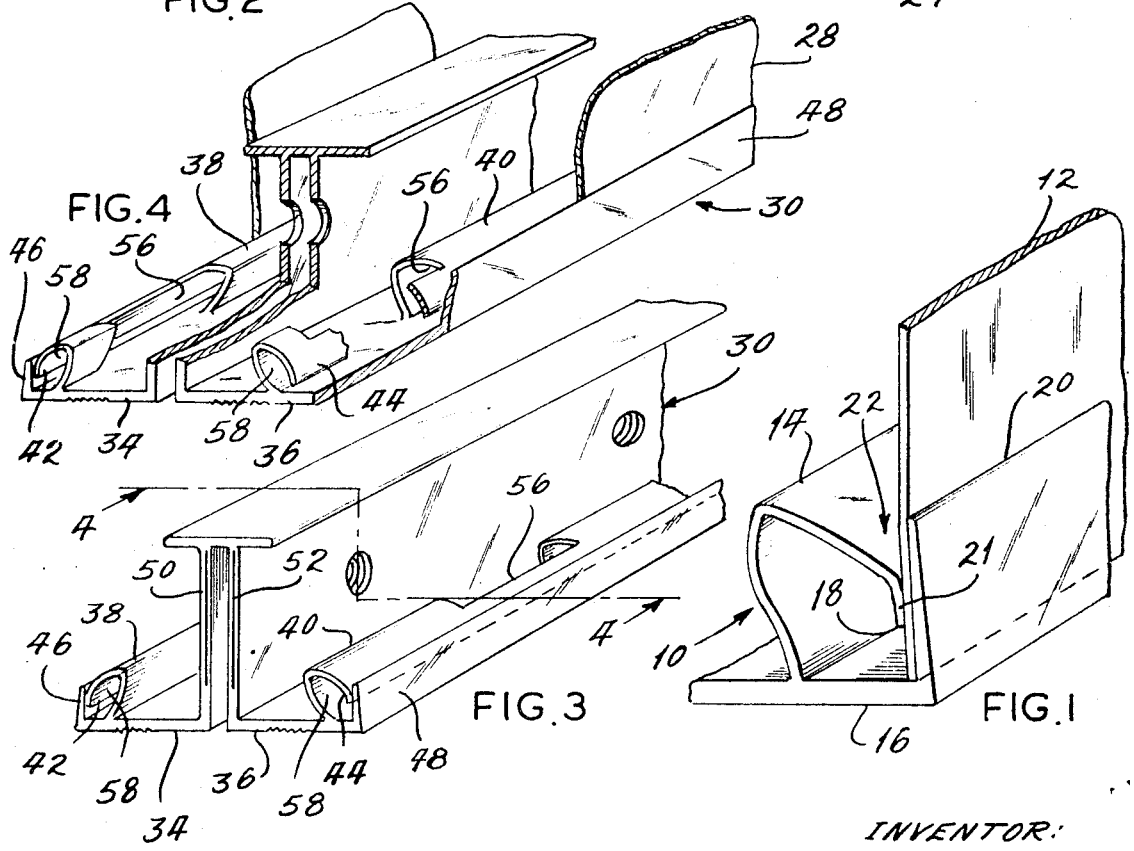

MEANS FOR CONNECTING STRUCTURAL MEMBERS TOGETHER

Application Ser. No. 147,348, filed May 27, 1971 and assigned to the same assignee as this application, is related to subject matter also disclosed in this application.

It is a common practice to fabricate structural members such as structural enclosures which may or may not be filled with some kind of a filler material such as an insulating filler, by connecting the various members of the structure together by some means which hold them in assembled condition. Many such structures exist and are available, and many include paneled structures formed by spaced wall members which are attached around their edges by edging strips. The known constructions, however, have had certain shortcomings including being difficult to construct, assemble, and install, and it has been difficult to maintain the members engaged with each other during assembly and filling of the structures. The known structures also have not had good sealed connections between their various members and as a result, undesirable leakages have occurred during filling, resulting in unsightly appearance, extra clean-up work, and the known structures have not provided means whereby the structural members are most advantageously anchored or united to the filler material so as to prevent the structural members from working loose from the filler and coming apart from each other. This has been especially troublesome where a plurality of similarly constructed structures are assembled and installed to form an enclosure or other device such as a refrigeration case, a building, or any other paneled structure or enclosure. It has also been difficult with the known panel constructions to provide sufficient structural integrity between adjacent connected panels to prevent damage thereto when assembled in a structure, and it has been difficult to insulate between adjacent panels by means which will stay in place and yet provide the desired necessary insulating and other characteristics. For these and other reasons, the known constructions have enjoyed relatively limited usefulness and have been unsuitable and unsatisfactory for many applications. The present improved construction is specifically designed to overcome these and other disadvantages and shortcomings of the known connection means and to form improved and more secure means for connecting parts of structural members to each other and to the rest of the structures of which they are parts, and the present means provide an easy convenient way to assemble structures and for connecting similar adjacent structures together in a condition whereby adjacent structures are insulated therebetween by means which maintain certain desired characteristics as well as structural integrity.

It is therefore a principal object of the present invention to provide improved means for connecting members together including particularly members used in the construction of enclosed and/or filled panel structures and the like.

Another object is to provide improved means for attaching members such as edging strips or the like to sheet members.

Another object is to provide easy to assemble means for connecting members, which means do not require any separate fasteners and maintain the connected members in their assembled condition and resist coming apart.

Another object is to provide improved means for assembling members including spaced wall members, into structures including those which are to be filled with a filler substance for some purpose.

Another object is to provide extrudable means for attaching to the edges of sheet members and the like, which means sealably and grippingly engage the sheet members.

Another object is to prevent leakage of filler material used to fill spaces formed by and between connected together structural members.

Another object is to provide means for maintaining multi-part structures in assembled condition even under relatively rough handling.

Another object is to provide improved means for connecting sheet members and edging strips, which members and strips are relatively easily assembled and resist coming apart.

Another object is to provide a relatively inexpensive extruded panel edging strip construction for use in forming the edges around enclosed structures such as structures designed to be filled with a substance in a cementitious condition, which filler substance unites structurally with said edging strip when it sets up.

Another object is to provide improved filled or hollow structural members which can be assembled quickly and easily and without requiring any special tools and which will retain their assembled condition even without any separate fastening means being required.

Another object is to simplify the procedures and reduce the personnel required for assembling multimember structures and particularly structures which enclose spaces.

Another object is to provide relatively simple means for joining members without requiring any separate fasteners, which means form a sealed and leakproof connection between the joined members.

These and other objects and advantages of the present invention will become apparent after considering the following detailed specification which discloses preferred embodiment in conjunction with the accompanying drawing which forms a part thereof, and wherein:

FIG. 1 is a fragmentary perspective view showing a portion of an extruded member and a sheet member engaged thereby constructed according to the present invention;

FIG. 2 is a fragmentary cross-sectional view showing a portion of two adjacent connected panel sections each including one or more edging strips and associated sheet members constructed according to the present invention;

FIG. 3 is a fragmentary perspective view showing a length of an extruded member similar to the edging strip of FIG. 2; and FIG. 4 is another perspective view partly in cross-section showing more of the details of the edging strips of FIGS. 2 and 3.

Referring to the drawing more particularly by reference numbers, number 10 identifies a member or strip for attaching around one or more of the side edges of a sheet member such as the sheet member 12. The member 10 is preferably constructed by extruding a relatively stiff but resilient plastic substance, and the member 10 includes an elongated hook or hook-like shaped portion 14 which is integral with base portion 16 of the member 10 along one side edge and extends to an opposite free side edge 18 which is preferably located adjacent to another wall or flange 20 which is attached to the base portion 16 at about a right angle. The wall 20 and the portion 21 of the hook shaped portion adjacent free edge 18 thereof, together define a generally V-shaped trough 22 which is shaped to relatively easily receive an edge portion of the sheet 12 therebetween when the sheet is placed with its edge in the trough 22 and then pressed into the position shown in FIG. 1 between the wall portions 20 and 21. In so doing, the sheet or panel 12 spreads the portions 20 and 21 apart sufficient to admit it into the space therebetween. If the member 10 is constructed of a material that is sufficiently stiff yet resilient it will grip the panel 12 and will form a sealed connection between the joined members for purposes which will be described later.

FIGS. 2–4 show an embodiment of the subject construction especially adapted for use as edging strips for around the edges of hollow or filled panels sections 24. Each of the panel sections 24 is shown as a filled structure formed by two spaced wall members or sheets 26 and 28 which are attached along one or more of their edges to similar edging strips 30. The space defined by and between the spaced wall members 26 and 28 and the edging strips 30 is filled with a filler material 32 such as a foam urethane or like filler which is introduced therein in a cementitious condition and sets up. The filler material 32 preferably completely fills and occupies the space defined within the structures and when the filler material sets, it unites with the members 26, 28 and 30 giving strength, rigidity and structural integrity to the structures as well as providing insulation or other characteristics. The selection of the filler material depends on the purpose for which the panel sections 24 are to be used.

The present invention resides primarily in the construction of the means 10 alone and as embodied in members such as the edging strips 30 including the way in which these members cooperate with wall members such as the wall members 12, 26 and 28 to provide a mechanical connection therebetween. Also, the way in which the subject means unite with the filler material 32 to unite the several different parts of filled sections is believed to be novel. The manner and simplicity with which the subject sections can be assembled and filled and then similar sections joined to other panels in building enclosures or other structures are also important to the invention.

Referring again to the embodiment of FIGS. 2–4, the edging strips 30 which are shown as being elongated, preferably extruded members, are defined by two similar spaced edge portions similar to the structure 10 in FIG. 1 for engaging edge portions of wall members. Each of the spaced edge portions includes a wall 34 or 36, respectively, having an associated hook shape portion or flange 38 or 40 integrally attached to corresponding surfaces thereof as shown. The walls 34 and 36 are shown arranged to be coplanar in the edging strips 30 and are connected together by other portions or wall members such as shown. The said other portions which connect the spaced walls 34 and 36 can have many different sizes and shapes including those shown and depending on the purpose for which the devices are used, but these connecting portions as such are not part of the present invention which resides mainly in the connection between the said members and the associated separate wall portions.

The hook shaped flanges 38 and 40 on the edging strip 30 are shown positioned to face in opposite directions and are located near opposite side edges of the strip. Each of the flanges 38 and 40 has a respective free edge portion 42 and 44 which extends to adjacent or abuts other flanges 46 and 48, respectively, which are integral right angle, or nearly right angle extensions, of the walls 34 and 36. It is usually preferred to have the flanges 46 and 48 extend at slightly less than a right angle to the plane of the associated wall portions 34 and 36 as clearly shown in the drawing.

The flanges 38 and 40 may be similar to cross-sectional shape to the flange 24 in FIG. 1, each having generally a hook shaped cross-section and each being integrally connected along one side edge, respectively, to surfaces of the associated walls 34 and 36 and extending therefrom along a curved path to adjacent midpoints on the walls 46 and 48 to form therewith V-shaped notches or grooves into which the edges of panels or wall members 26 and 28 can be moved to force separation of the flanges 38 and 40 away from the respective flanges 46 and 48 so that the panel edges can move therebetween. It is important to the present construction that the hook shaped flanges 38 and 40 extend to as close as possible, and if possible actually bear against, the respective flanges 46 and 48 before a panel is inserted therebetween so that the edges of the panel must move the portions apart and in so doing form a resilient connection which seals between the connected members. The force required to insert the panels to the positions shown depends on the type of material selected for construction of the edging members 30 and the size and thickness of the parts involved.

The shape of the hook shaped flanges 38 and 40 preferably should also be such that the panels 26 and 28 will not dig into and damage them during insertion but instead will simply bend or flex one or both members to open a space for the panel to enter. The ends of the subject edging strips can also be mitered where they are to extend along several adjacent edges of a panel. When the panels are properly positioned between the said cooperating flanges as described, the resiliency of the flanges will cause them to grip the panels and to apply sufficient pressure to hold the panels in place therebetween. The resilient gripping action also provides the sealed connection between the flanges and the panels. The fact that the flanges 46 and 48 are preferably formed at angles that are slightly less than 90° relative to the associated connected wall portions 34 and 36 is an advantage especially when used in structures that have spaced parallel opposite walls because this causes some wedging action to take place between the installed sheets or panels and the flanges 46 and 48 which increases the holding force between them thereby helping to maintain the structure in its assembled condition. The wedging action also improves the sealed connection between the sheets and the flanges thereby minimizing the possibility for leakage when a structure so formed is filled with a filler material which is introduced in a liquid or cementitious condition. The angular relationship of the flanges 46 and 48 and the way they press against the sheet members or panels also reduces the possibility of things catching on them and causing damage. Hence, it can be seen that a structure such as disclosed, when in its assembled condition with or without being filled, will have relatively substantial mechanical wedging and holding action between its several members, and this is achieved without providing any special fasteners to hold the members together. This is very important because it means that the structures will resist coming apart even under relatively rough handling. This is highly desirable and greatly simplifies the holding and supporting of the structures while they are being filled.

As already indicated, the subject edging strips 30 are preferably, though not necessarily, constructed of a relatively rigid plastic material such for example as acrylic butyral sterate (ABS) or a like material, but it is anticipated that other extrudable plastic or plastic like substances can also be used depending upon the rigidity, strength, flexibility, resiliency and other characteristics desired and the purpose for which the structures or sections are to be used. In some cases, it may even be desirable to use a relatively flimsy or a highly resilient plastic.

During extrusion of the means 10 or edging strips 30 the material from which they are constructed is passed through an extrusion die opening (not shown) which has the same shape as the cross-sectional shape of the member being formed. At the same time, it may be desired for reasons that will be explained to simultaneously feed parallel strips or bands such as bands 50 and 52 of a material that is stronger than the extrusion material through the portions of the die opening that form other portions of the edging strips 30. The bands 50 and 52 can be steel bands or they can be of some other materials such as of some other metal or plastic that has particular desired characteristics. The optional strips 50 and 52, especially when constructed of a substance such as steel, provided added rigidity and strength to the structure for some purposes usually related to the means that are used to connect adjacent panel sections together. One of many possible ways to connect adjacent similar panels in spaced relation is disclosed in the drawings for illustrative purposes. The bands or strips 50 and 52 are important optional features to give added strength and rigidity to the structure and provide additional means for structurally uniting the edging strips 30 with the filler material when using means such as spaced pins 54. It is also contemplated to attach the strips 50 and 52 adhesively or otherwise to the side walls of the same portions of the strips 30, if desired. The use of the strips 50 and 52 helps to prevent tearing of the edging strips 30 when several similar panel sections are connected together by some means to form a structure such as a refrigeration case or vault or other structure. The means for fastening adjacent panels, however, are not part of the present invention.

Similar spaced openings 56 are formed in the fishhook shaped flanges 38 and 40 as shown in FIGS. 3 and 4. The openings 56 provide communication between the spaces 58 enclosed by the subject fishhooks including the spaces formed outside thereof. During filling of the subject structure, the fille material is able to easily filler through the opening 56 to fill the entire space and to provide substantially greater structural integrity between the several members of the filled structure and between the members and the filler material itself. This substantially reduces or prevents the possibility of the edging strips being pulled loose from the rest of the structure and improves the overall structural integrity of the structures. Even without providing the opening 56, however, some of the filler material, especially when it is introduced under pressure, will be able to enter the spaces defined within flanges 38 and 40 but this may require some bending of the flanges. It is therefore usually much preferred to provide openings such as the openings 56 because it is then not necessary for the filler material to have to flex the flanges to flow around the free edges thereof and the flanges can remain at all times closely engaged with the sheet members providing desired added support therefor. The size, shape and spacing of the openings 56 are not critical, and they can be formed on different sides of the flanges 38 and 40 and they can be formed by notching the free edges thereof. The particular size and shape of the openings 56 as shown in the drawing, however, and an opening spacing of from about 4 to 8 inches has been found to provide very satisfactory results depending to some extent on the type of filler material used, and the equipment used to do the filling. One type of filler material that has been used with satisfactory results for some purposes is the urethane foam type. The openings 56 are therefore important because they allow the filler material to relatively easily and uniformly completely fill the structures and integrally units all of the structure forming parts thereof. The means for extruding the subject members including the edging strips 30, the means for attaching adjacent similar structural members formed using such edging strips, and the means for filling the structures or panels after they have been assembled are not part of the present invention as such, and known means for accomplishing these things are available and in use.

After two adjacent panel sections are joined and locked together as shown, spaces 60 remain between the edging members 30 on adjacent sections 24, and these spaces 60 receive sealing means such as sealing gaskets 62 which are shown for illustrative purposes to complete the understanding of the structure but are not part of this invention. The gaskets 62 are covered by copending application Ser. No. 147,348, filed May 27, 1971 and assigned to applicant's assignee.

The subject means thus provide improved means for assembling members including structural members and improved means for uniting the various parts and components thereof. Many different known and available materials can be used in the construction of the parts and size, shape, thickness, and spacing of the various parts as well as the selection of materials to be used can all be varied depending upon the characteristics desired for the finished product.

Thus there has been shown and described a novel means for joining and uniting members including members used in the construction of hollow and filled structural building panels as well as other devices, which means fulfill all of the objects and advantages sought therefor. Many changes, modifications, alterations, variations and other uses and applications of the present means, however, will become apparent to those skilled in the art after considering this specification and the accompanying drawing. All such changes, modifications, alterations and other uses and applications which do not depart from the spirit and scope of the invention are deemed to be covered by the invention which is limited only by the claims which follow.

What is claimed is:

1. Means for attaching to edges of panel members and the like comprising an elongated member having integral first and second wall portions substantially at right angles to each other, an elongated flange having first and second side edges, said first side edge being connected integrally to the first wall portion at a location thereon spaced from the second wall portion, said flange having a channel shaped cross-section that extends outwardly from said first side edge and from the first wall portion to which it is connected curving back to the second side edge, said second side edge being a free side edge positioned adjacent to said second wall portion, said flange and the portions of the integral first and second wall portions that extend between the connected and the free edges thereof enclosing an elongated space, the second wall portion adjacent to the free side edge of said flange and the adjacent portion of said flange together defining a groove for receiving an edge of a panel member which can be pressed therein to separate the free edge of the flange from the adjacent second wall portion to admit the panel therebetween, said elongated member and said flange being constructed as an integral member of a material capable of yielding to admit and grip the panel, the channel cross-sectional shape of said flange increasing its ability to bend away from the second wall portion to admit the panel member.

2. The edging strip defined in claim 1 including at least one opening formed through the said flange, said opening being located in the flange to facilitate filling of the elongated space defined therein when a filler material is introduced adjacent thereto.

3. The means defined in claim 1 wherein said elongated wall member has spaced opposite side edges each defined by similar integral first and second wall portions and a similar flange integrally connected respectively to each of the first wall portions and extending therefrom to opposite free side edges adjacent to the associated second wall portions to define closed spaces extending along and adjacent to each opposite side edge of the elongated wall member.

4. The means defined in claim 3 wherein said similar first wall portions are coplanar, and means including other wall portions integrally connecting said similar first wall portions in spaced relation.

5. An edging strip formed of relatively stiff but resilient plastic, said strip being contructed to be engaged with the edge portion of a panel member and comprising an extruded one-piece elongated member having a free edge, an integral first flange connected thereto and extending the length thereof, said member and said first flange being angularly related to each other at about a right angle, and a second flange of channel shaped cross-section having a first side edge integral with the said member at a location thereon spaced from and parallel to the first flange, said second channel shaped flange having connected angularly related portions one of which terminates at a free side edge positioned adjacent to and extending along the first flange at an intermediate location thereon spaced from the said member, the said second flange defining with the said member and with the adjacent portion of said first flange an elongated space which extends substantially the length of the edging strip, the channel shape of said second flange facilitating movement of the free side edge relative to said first flange when moving the edge portion of a panel member therebetween.

6. The edging strip defined in claim 5 wherein said first and second flanges cooperate to form an exposed substantially V-shaped trough which extends the length thereof.

7. The edging strip defined in claim 5 wherein said member has spaced side edges each of which has a similar right angle first flange connected thereto and a similar integral second flange associated with each of said first flanges.

8. The edging strip defined in claim 5 wherein the elongated member is extruded from a relatively stiff but bendable plastic substance.

9. The edging strip defined in claim 5 wherein said second flange has at least one hole formed therethrough communicating the elongated space defined thereby with the space outside of the said second flange.

10. The edging strip defined in claim 5 wherein said second flange has a plurality of spaced openings formed therethrough communicating the elongated space defined thereby with the space outside of the said second flange.

11. An edging strip for around panel sections such as around the edges of panel sections which are to be filled with a filler material introduced under pressure, each panel section including spaced wall portions, said edging strip cooperating with edges of the spaced wall portions to enclose a space therebetween, said edging strip comprising a one-piece elongated extruded member including substantially coplanar wall portions extending outwardly to opposite free edges, an integral first flange connected respectively to each of the said opposite free edges of said coplanar wall portions and extending therefrom at substantially right angles to the plane of said wall portions, and a second flange of generally hook shaped cross-section formed integral with each of said spaced coplanar wall portions at a location thereon spaced inwardly from the said associated first flanges, said hook shaped second flanges having spaced side edges one of which is connected to the associated coplanar wall portion and the other of which extends to adjacent the associated first flange at a location spaced from the said associated wall portions, said first and second flanges and the wall portions therebetween defining substantially closed spaces extending along and adjacent to the opposite free edges of the coplanar wall portions, said first and second flanges being constructed of relatively stiff but resilient material so that they can be forced apart to admit the edge of a wall portion therebetween, the hook shape of the second flanges increasing the ability of said second flanges to bend to admit the edge of the said wall portion.

12. The edging strip defined in claim 11 wherein each of said second flanges has at least one opening therethrough in communication with the substantially closed space partly defined thereby.

13. The edging strip defined in claim 11 wherein each of said second flanges has a plurality of spaced openings therealong each communicating with the associated substantially closed space partly defined thereby.

14. The edging strip defined in claim 11 wherein the said first flanges are angularly related to the coplanar wall portion at slightly less than a right angle.

15. The edging strip defined in claim 11 constructed of extruded acrylic butyral sterate plastic.

16. An edging piece for connecting to edges of panel members comprising an elongated wall member having spaced side edges, means adjacent at least one of said side edges for engaging an edge portion on a panel member, said means including a first elongated flange formed integrally with the said one side edge and extending therefrom at an angle of about 90° relative to the plane of said wall member, and a second elongated flange attached to the wall member at a location spaced from the said one flange, said second flange extending parallel to the first flange and defined by spaced connected flange wall portions which partially enclose an elongated space therebetween, one of said spaced flange wall portions having a side edge formed integral with the elongated wall member, the other flange wall portion having a free edge positioned adjacent to an intermediate location on the first flange, said first and second flanges and the portion of the said wall member extending therebetween defining a substantially closed space along the length of the edging piece, said edging piece being constructed of a relatively stiff but resilient plastic substance, and the shape of said second flange facilitating movement of the free edge thereof relative to the first flange to resiliently engage the edge of a panel member inserted therebetween.

17. The edging piece defined in claim 16 including at least one opening formed through the second flange communicating the elongated space defined thereby with the space outside of the said second flange.

18. A one-piece elongated strip formed of an extruded plastic material characterized by being relatively stiff but resilient, said strip having an edge portion for engagement with an edge portion of a panel member to be connected to the strip during the construction of an enclosure to be substantially filled and united with a substance to be introduced therein under pressure, said strip comprising a first elongated portion including the edge portion for engagement with the panel edge portion to be joined thereto, a channel shaped flange having spaced first and second side edge portions, said first flange side edge portion being connected integrally with the said edge portion and extending along the length thereof, the second channel edge portion being free and positioned extending along and adjacent to said strip at a location thereon spaced from the first channel edge portion whereby said flange and the adjacent portion of the strip define an enclosed space and an exposed groove along the length of the channel shaped flange and the adjacent edge portion of the strip into which the edge portion of the panel can be inserted, the channel shape of said flange enabling said flange to flex to admit the said panel edge portion and to thereafter resiliently engage and hold the inserted panel edge portion in its inserted condition, and at least one opening through said flange through which a filler substance introduced into the enclosure partly formed by said elongated strip can move to enter and fill the said enclosed space.

* * * * *